US012759879B2

(12) United States Patent
Terrien et al.

(10) Patent No.: US 12,759,879 B2
(45) Date of Patent: Oct. 13, 2026

(54) PROCESS FOR PURIFICATION OF HELIUM TO VERY HIGH PURITY

(71) Applicant: Air Liquide Advanced Technologies U.S. LLC, Houston, TX (US)

(72) Inventors: Paul Terrien, Newport, DE (US); Kirsten O'Sullivan, Newport, DE (US)

(73) Assignee: L'Air Liquide, Societe Anonyme Pour l'Etude et l'Exploitation des Procedes Georges Claude, Paris (FR)

(*) Notice: Subject to any disclaimer, the term of this patent is extended or adjusted under 35 U.S.C. 154(b) by 288 days.

(21) Appl. No.: 18/737,054

(22) Filed: Jun. 7, 2024

(65) Prior Publication Data

US 2024/0409409 A1 Dec. 12, 2024

Related U.S. Application Data

(60) Provisional application No. 63/472,121, filed on Jun. 9, 2023.

(51) Int. Cl.
*B01D 53/22* (2006.01)
*C01B 23/00* (2006.01)

(52) U.S. Cl.
CPC .... *C01B 23/0042* (2013.01); *C01B 2210/001* (2013.01); *C01B 2210/0031* (2013.01)

(58) Field of Classification Search
CPC .......... C01B 23/0042; C01B 2210/001; C01B 2210/0031
See application file for complete search history.

(56) References Cited

U.S. PATENT DOCUMENTS 4,701,187 A 10/1987 Choe et al.
9,375,677 B2 6/2016 Karode
10,188,982 B2 1/2019 Keller et al.
2010/0101410 A1* 4/2010 Prasad .................... C01B 3/505 95/53
2013/0087444 A1* 4/2013 Panza ................... C01C 1/0441 422/186.04
2016/0115029 A1 4/2016 Van Leuvenhaege et al.
2016/0228813 A1* 8/2016 Schwartz ............ C01B 23/0021
2017/0320736 A1* 11/2017 Voss ...................... B01D 53/229
2018/0353898 A1* 12/2018 Hamad .............. B01D 53/1456
2019/0176083 A1* 6/2019 Bauer ................. C01B 23/0052
(Continued)

*Primary Examiner* — Anthony Shumate
(74) *Attorney, Agent, or Firm* — Allen E. White; Elwood L. Haynes

(57) ABSTRACT

A process for purifying a helium containing stream, including introducing a feed gas stream into a first membrane separation unit, thereby producing a first permeate stream, and a first residue stream. Introducing the first permeate stream into a first dehydrogenation unit, thereby producing a first dehydrogenated gas stream. Introducing the first dehydrogenated gas stream into a second membrane separation unit, thereby producing a second permeate stream, and a second residue stream. Introducing the second permeate stream into a second dehydrogenation unit, thereby producing a second dehydrogenated gas stream. And introducing the second dehydrogenated gas stream into a helium pressure swing adsorption unit, thereby producing a product helium stream, and a helium-lean stream. Wherein the product helium stream contains more than 99.9% mol helium, and less than 0.1% mol hydrogen.

7 Claims, 1 Drawing Sheet

(56) References Cited

U.S. PATENT DOCUMENTS

| | | | | |
|---|---|---|---|---|
| 2019/0184332 | A1* | 6/2019 | Cnop | B01D 53/226 |
| 2020/0088466 | A1* | 3/2020 | White | B01D 53/229 |
| 2020/0385269 | A1* | 12/2020 | Le Guludec | F25J 3/0233 |
| 2021/0402345 | A1* | 12/2021 | He | B01D 53/047 |
| 2022/0106190 | A1* | 4/2022 | Terrien | B01D 53/229 |
| 2022/0314163 | A1* | 10/2022 | Salazar Duarte | B01D 53/1475 |
| 2025/0276275 | A1* | 9/2025 | Terrien | B01D 53/227 |

* cited by examiner

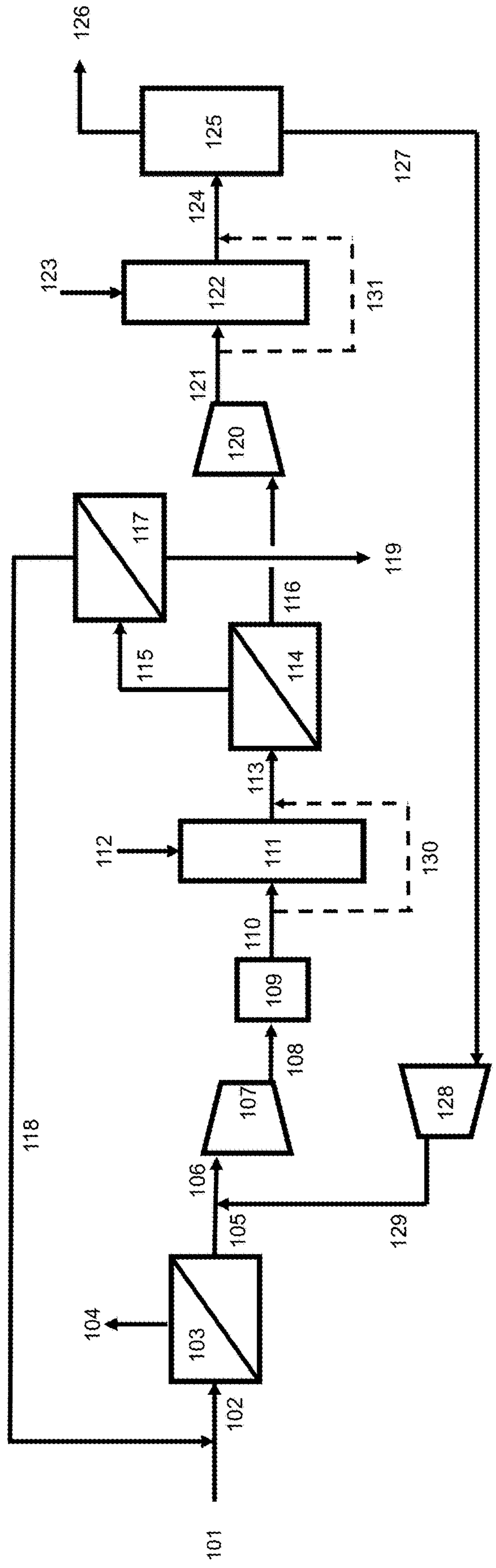
126
125
127
124
123
122
131
121
120
117
119
116
115
114
113
112
111
130
110
109
108
107
128
118
106
105
129
104
103
102
101

PROCESS FOR PURIFICATION OF HELIUM TO VERY HIGH PURITY

CROSS REFERENCE TO RELATED APPLICATIONS

This application claims the benefit of priority under 35 U.S.C. § 119 (a) and (b) to U.S. Provisional Patent Application No. 63/472,121, filed Jun. 9, 2023, the entire contents of which are incorporated herein by reference.

BACKGROUND

Helium is a very valuable molecule present generally in very small amounts in natural mixtures of gases, such as natural gas extracted from oil and gas fields. In order to use it, it has to be separated and purified from the mixture containing it to a degree of purity varying depending of the application. Purification can be achieved through various industrial processes ranging from cryogenic processes to adsorption and membrane separation. This invention relates to one such method of helium purification using a combination of membranes process, Pressure Swing Adsorption (PSA) process and catalytic oxidation of hydrogen.

A typical helium containing stream contains less than 10% mol helium, and very often less than 1% mol. Purification technologies are generally subdivided into:

Pre-concentration technologies to obtain substantial concentration of helium while maximizing its recovery: typically, membranes and cryogenic technologies, Final purification technologies: from a reasonably concentrated stream (at least 10% mol of helium), producing a stream with more than 98% mol of helium. The leading technology to achieve this purification is Pressure Swing Adsorption.

Membrane separation is a very cost effective and simple way to separate gases but can only achieve a limited amount of enrichment (for instance from 1% mol to 5% mol) so multiple stages may be necessary to purify a gas to a concentration high enough for final purification.

U.S. Pat. No. 9,375,677 shows a process using three membrane stages to concentrate helium. This process is very effective but is insufficient by itself to achieve final helium purity.

In order to do so, combining with PSA technology is an obvious solution. It is well known to combine PSA and membrane technology for helium purification. Few examples below:

U.S. Pat. No. 10,188,982 B2 (LINDE): shows a combination of PSA technology and membrane for helium purification, however membrane is used downstream of PSA. The efficiency of such an approach may be acceptable but generally it is more advantageous to have a higher concentration to run the PSA. In this patent, the PSA cycle is actually adapted using the help of the membrane permeate in order to function properly.

US20160115029A1 (AIR PRODUCTS): In this patent application an additional step is described allowing to remove an impurity such as helium using partial oxidation method. However, this patent does not provide an effective way to deal with a high hydrogen concentration along with a high methane concentration. The example provided has no methane in the gas.

U.S. Pat. No. 4,701,187 (Air Products expired patent): This patent generally presents the concept of a process consisting of a membrane unit feeding into a PSA unit where the low-pressure gas from the PSA is recycled back to the membrane unit. However, this patent focuses on various separations including only a mixture of N2/CH4/He as it relates to helium purification. This fails to address the issue of how to manage a high level of hydrogen.

From the prior art indicates, we are still left with the problem of managing a stream containing a high level of methane, and significant amounts of hydrogen and helium.

Generally, solutions exist to manage hydrogen involving catalytic oxidation methods such as described in US20160115029A1 but the following additional issues exist:

In order to achieve a very low hydrogen concentration in the product, the hydrogen removal should be done on a stream as enriched as possible in terms of hydrogen and helium.

While removing hydrogen by catalytic oxidation, if the hydrogen content in the gas treated is too high, the exothermic reaction will generate a lot of heat therefore increasing the temperature to a level where methane could react with air/oxygen. This in turn would increase the temperature further and prohibit the efficient selective removal of hydrogen.

The proposed solution provides a solution to achieve a very high helium purity (hydrogen content typically in the product of 10 ppmv or less) while also avoiding reacting methane with oxygen.

SUMMARY

A process for purifying a helium containing stream, including introducing a feed gas stream into a first membrane separation unit, thereby producing a first permeate stream, and a first residue stream. Introducing the first permeate stream into a first dehydrogenation unit, thereby producing a first dehydrogenated gas stream. Introducing the first dehydrogenated gas stream into a second membrane separation unit, thereby producing a second permeate stream, and a second residue stream. Introducing the second permeate stream into a second dehydrogenation unit, thereby producing a second dehydrogenated gas stream. And introducing the second dehydrogenated gas stream into a helium pressure swing adsorption unit, thereby producing a product helium stream, and a helium-lean stream. Wherein the product helium stream contains more than 99.9% mol helium, and less than 0.1% mol hydrogen.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein:

FIG. 1 is a schematic representation of the process in accordance with one embodiment of the present invention.

ELEMENT NUMBERS

101=feed gas stream
102=combined feed stream
103=first membrane separation unit
104=first residue stream
105=first permeate stream
106=first combined process stream
107=first process stream compressor

108=first compressed process stream
109=process stream purification unit
110=purified process stream
111=first dehydrogenation unit
112=first oxygen-rich air stream
113=first dehydrogenated process stream
114=second membrane separation unit
115=second residue stream
116=second permeate stream
117=third membrane separation unit
118=third residue stream
119=third permeate stream
120=second process stream compressor
121=second compressed process stream
122=second dehydrogenation unit
123=second oxygen-rich air stream
124=second dehydrogenated process stream
125=helium pressure swing adsorption unit
126=medium-pressure product helium stream
127=low-pressure helium-lean stream
128=booster
129=pressurized helium-lean stream
130=first bypass line (around first dehydrogenation unit)
131=second bypass line (around second dehydrogenation unit)

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention comprises a method to purify helium as a first step upstream of a helium liquefier unit. Helium liquefaction requires a very deep purification process upstream, removing impurities such as H2, N2, CH4 to ppm levels or below.

Feed gas stream 101 may contain a large amount of methane (at least 10% mol), and the ratio of helium concentration to hydrogen concentration is at most 30:1. For example, if feed gas stream 101 contains 3% mol helium, then it also contains at least 0.1% mol hydrogen.

Turning to the sole FIGURE, one embodiment of the present invention is provided. Feed gas stream 101 is combined third residue stream 118, thereby producing combined feed stream 102. Combined feed stream 102 is then introduced into first membrane separation unit 103, thereby producing first residue stream 104 and first permeate stream 105.

First residue stream 104 is routed for further processing, this may include power generation, LNG production, pipeline distribution or a mix thereof. First permeate stream 105 is combined with pressurized helium-lean stream 129, thereby producing first combined process stream 106. First combined process stream 106 then enters first process stream compressor 107, thereby producing first compressed process stream 108.

First compressed process stream 108 is introduced into process stream purification unit 109, thereby producing purified process stream 110. Process stream purification unit 109 removes water, and potentially oil removal which may have been introduced by first process stream compressor 107. At least a portion of purified process stream 110 is then introduced into first dehydrogenation unit 111, along with first oxygen-rich air stream 112, thereby producing first dehydrogenated process stream 113. First dehydrogenation unit 111 utilizes first oxygen-rich air stream 112 to catalytically oxidize hydrogen into water. This reaction is typically performed on a catalyst which may be palladium based or platinum based.

In order to reduce the hydrogen content sufficiently in the first stage of dehydrogenation, first dehydrogenation unit 111 generally does not have to be optimized for full removal of H2. It is not necessary to oversize the equipment to remove down to a very low level such as ppm quantities, and proper sizing of this equipment is something one of ordinary skill in the art can do without undue experimentation. It may even be economical to design the system to only treat a portion of the flow, whereas the rest of the gas would bypass this first dehydrogenation unit 111 in first bypass line 130. The final hydrogen specification is achieved in second dehydrogenation unit 122 (below). As with first dehydrogenation unit 111, a portion of second compressed process stream 121 (below) may bypass second dehydrogenation unit 122 in second bypass line 131.

First dehydrogenated process stream 113 is then introduced into second membrane separation unit 114, thereby producing second residue stream 115 and second permeate stream 116. If a portion of purified process stream 110 is sent to first bypass line 130 this is combined with first dehydrogenated process stream 113 prior to introduction into second membrane separation unit 114. Second residue stream 115 is then introduced into third membrane separation unit 117, thereby producing third residue stream 118 and third permeate stream 119. Third residue stream 118 is recycled and at least a portion is combined with feed gas stream 101, thereby producing combined feed stream 102.

Second permeate stream 116 is introduced into second process stream compressor 120, thereby producing second compressed process stream 121. Second compressed process stream 121 is then introduced into second dehydrogenation unit 122, along with second oxygen-rich air stream 123, thereby producing second dehydrogenated process stream 124. Second dehydrogenation unit 122 utilizes second oxygen-rich air stream 123 to catalytically oxidize hydrogen into water. This reaction is typically performed on a catalyst which may be palladium based or platinum based.

Second dehydrogenated process stream 124 is introduced into helium pressure swing adsorption unit 125, thereby producing medium-pressure product helium stream 126 and low-pressure helium-lean stream 127. If a portion of second compressed process stream 121 is sent to second bypass line 131 this is combined with second dehydrogenated process stream 113 prior to introduction into helium pressure swing adsorption unit 125. Low-pressure helium-lean stream 127 is partially depleted of helium but contains almost all other impurities from feed gas stream 101. Medium-pressure product helium stream 126 comprises highly concentrated helium (at least 99.9 mol %). Low-pressure helium-lean stream 127 is introduced into booster 128 after being mixed with permeate stream 119, thereby producing pressurized helium-lean stream 129.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for purifying a helium containing stream, comprising:

introducing a feed gas stream into a first membrane separation unit, thereby producing a first permeate stream, and a first residue stream, introducing at least a portion of the first permeate stream into a first dehydrogenation unit, thereby producing a first dehydrogenated gas stream, introducing the first dehydrogenated gas stream into a second membrane separation unit, thereby producing a second permeate stream, and a second residue stream, introducing at least a portion of the second permeate stream into a second dehydrogenation unit, thereby producing a second dehydrogenated gas stream, and introducing the second dehydrogenated gas stream into a helium pressure swing adsorption unit, thereby producing a product helium stream, and a helium-lean stream, wherein the product helium stream contains more than 99.9% mol helium, and less than 0.1% mol hydrogen.

2. The process of claim 1, further comprising introducing the first permeate stream into a first process stream compressor thereby producing a first compressed permeate stream which is then introduced into the first dehydrogenation unit.

3. The process of claim 2, further comprising introducing the first compressed permeate stream into a purification unit thereby producing a purified, compressed permeate stream which is then introduced into the first dehydrogenation unit.

4. The process of claim 1, further comprising introducing the first permeate stream into a purification unit thereby producing a purified permeate stream which is then introduced into the first dehydrogenation unit.

5. The process of claim 1, further comprising introducing the second permeate stream into a second process stream compressor thereby producing a second compressed permeate stream which is then introduced into the second dehydrogenation unit.

6. The process of claim 1, further comprising introducing the second residue stream into a third membrane separation unit, thereby producing a third permeate stream and a third residue stream, wherein the third residue stream is combined with the feed gas stream prior to introduction into the first membrane separation unit.

7. The process of claim 1, wherein the helium-lean stream is combined with the first permeate stream prior to introduction into first dehydrogenation unit.

* * * * *